United States Patent
Dumont et al.

(10) Patent No.: US 10,471,506 B2
(45) Date of Patent: Nov. 12, 2019

(54) APPARATUS AND METHODS FOR FILTERING METALS

(71) Applicant: Alcoa Canada Co., Quebec (CA)

(72) Inventors: Robert Dumont, Quebec (CA); Francis Caron, Quebec (CA); Patrice Côte, Quebec (CA); Jean-Francois DesMeules, Quebec (CA)

(73) Assignee: Alcoa Canada Co., Montreal, Quebec (CA)

( * ) Notice: Subject to any disclaimer, the term of this patent is extended or adjusted under 35 U.S.C. 154(b) by 10 days.

(21) Appl. No.: 15/607,062

(22) Filed: May 26, 2017

(65) Prior Publication Data

US 2017/0341140 A1    Nov. 30, 2017

Related U.S. Application Data

(60) Provisional application No. 62/343,489, filed on May 31, 2016.

(51) Int. Cl.

| | |
|---|---|
| *B22D 43/00* | (2006.01) |
| *B01D 37/02* | (2006.01) |
| *B01D 37/04* | (2006.01) |
| *C22B 9/02* | (2006.01) |

(Continued)

(52) U.S. Cl.
CPC .......... *B22D 43/004* (2013.01); *B01D 37/02* (2013.01); *B01D 37/046* (2013.01); *B22C 9/086* (2013.01); *C22B 9/023* (2013.01); *C22B 21/066* (2013.01); *B22C 9/08* (2013.01); *B22D 43/001* (2013.01); *C22B 9/02* (2013.01); *Y02P 10/234* (2015.11)

(58) Field of Classification Search
CPC ..... C22B 9/023; C22B 21/006; B22D 43/004; B01D 37/02; B01D 37/046
See application file for complete search history.

(56) References Cited

U.S. PATENT DOCUMENTS

| | | | |
|---|---|---|---|
| 5,322,546 A | 6/1994 | Holsgrove et al. | |
| 5,673,902 A * | 10/1997 | Aubrey | B22D 43/004 210/184 |
| 7,666,248 B2 | 2/2010 | Belley et al. | |

(Continued)

FOREIGN PATENT DOCUMENTS

| | | |
|---|---|---|
| CA | 2871245 A1 | 10/2013 |
| CN | 1942266 A | 4/2007 |

(Continued)

OTHER PUBLICATIONS

SU 947210 machine translation (Year: 1982).*

(Continued)

*Primary Examiner* — Tima M. McGuthry-Banks
(74) *Attorney, Agent, or Firm* — Greenberg Traurig, LLP (57) ABSTRACT

An apparatus and method for filtering molten metal, such as aluminum or an aluminum alloy includes at least one ceramic foam filter or any other type of filtration media such as porous tube or alumina balls disposed in a receptacle for the molten metal. A vibrator vibrates at least one of the filter, the receptacle or the metal and may be used to induce priming, filtering and/or drainage of the filter. The vibrator may be retrofitted to an existing filter system and may be adjustable in frequency and amplitude. The vibration may be continuous over a given period or produced in a single shock.

14 Claims, 8 Drawing Sheets

(51) Int. Cl.
*C22B 21/06* (2006.01)
*B22C 9/08* (2006.01)

(56) References Cited

U.S. PATENT DOCUMENTS

| | | | |
|---|---|---|---|
| 2006/0086435 A1 | | 4/2006 | Anderson et al. |
| 2008/0053275 A1* | | 3/2008 | Belley .................. B22D 11/119 75/407 |

FOREIGN PATENT DOCUMENTS

| CN | 202410977 U | | 9/2012 |
|---|---|---|---|
| CN | 202804092 U | * | 9/2012 |
| CN | 202576520 U | | 12/2012 |
| CN | 202804092 | | 3/2013 |
| CN | 204198816 U | * | 3/2015 |
| JP | 3169226 B2 | | 3/2001 |
| SU | 947210 | * | 1/1982 |
| WO | WO 2006110974 A1 | * | 10/2006 |

OTHER PUBLICATIONS

CN 204198816 U machine translation (Year: 2015).*
CN 202804092 U machine translation (Year: 2013).*
CN 202576520 machine translation (Year: 2012).*
Family list of WO 9412301 A1 (Year: 1994).*
CN 202410977 U machine translation (Year: 2012).*
Family list of CN 1942266 A (Year: 2007).*
SU 947210 A1 human translation (Year: 1982).*
Breton, F. et al., Advanced Compact Filtration (ACF): An Efficient and Flexible Filtration Process, Light Metals 2013, (2013).
Fritzsch, R. et al., Effect of Electromagnetic Fields on the Priming of High Grade Ceramicfoam Filters (CFF) with Liquid Aluminum, Light Metals 2013, (2015), pp. 929-935.
International Search Report and Written Opinion for PCT Application No. PCT/IB2017/000781, dated Sep. 18, 2017.

* cited by examiner

APPARATUS AND METHODS FOR FILTERING METALS

CROSS REFERENCE TO RELATED APPLICATIONS

The present application claims the benefit of U.S. Provisional Application No. 62/343,489, filed May 31, 2016, entitled, Apparatus and Methods For Filtering Metals, which is incorporated by reference herein in its entirety.

FIELD

The present invention relates to the filtration of aluminum metal in a molten state, and more particularly, to filtration by porous filters, such as ceramic filters.

BACKGROUND

Ceramic filters, e.g., ceramic foam filters (CCFs) are known for use in filtering or removing contaminants from molten metal, e.g., aluminum metal and alloys. The use of such filters has associated limitations and challenges, such as, starting a flow of molten metal through the filter by displacing air in the internal pores/passageways in the filter (priming). Known methods for accomplishing this task include pre-heating the filter, establishing a sufficient head of molten metal above the filter to exert pressure to push the molten metal through the filter, applying a negative pressure on the downstream side of the filter by applying a vacuum on the downstream side, and agitating/driving the molten metal against and through the filter with an electromagnetic field which has a hydrodynamic effect on the molten metal. Notwithstanding, these known methods, alternative methods and apparatus for facilitating metal flow through a filter remain desirable.

SUMMARY

The disclosed subject matter relates to a filter device having a receptacle for molten metal, the receptacle having an inlet through which the metal may enter the receptacle and an outlet through which the metal may exit the receptacle; a filter element within the receptacle positioned between the inlet and the outlet, the filter capable of passing molten metal there through; and a vibrator capable of inducing vibrations in the metal.

In another embodiment, the vibrator contacts a surface of the receptacle.

In another embodiment, the vibrator has a driven element that contacts the metal.

In another embodiment, the driven element is immersed in the metal.

In another embodiment, the device has an arm extending between the vibrator and the driven element.

In another embodiment, the arm is L-shaped.

In another embodiment, further including a support for the receptacle and wherein the arm is attached to the support.

In another embodiment, further including at least one resilient element interposed between the arm and the support enabling the arm to vibrate under the influence of the vibrator at least partially independently of the support.

In another embodiment, the vibrator is at least one of electrically, pneumatically or hydraulically driven.

In another embodiment, the vibrator generates a force with a direction between 45° to 90° relative to the direction of metal flow.

In another embodiment, the vibrator is mounted on an exterior surface of the receptacle proximate the filter element.

In another embodiment, further including a controller for the vibrator, the controller capable of adjusting the vibrator in at least one of frequency and amplitude.

In another embodiment, the receptacle has an inner liner that receives the metal and an outer shell.

In another embodiment, further including at least one resilient member interposed between the inner liner and the outer shell.

In another embodiment, the at least one resilient member at least partially isolates the vibration of the inner liner from the shell.

In another embodiment, the filter is a ceramic foam filter.

In another embodiment, the filter has >50 pores per inch.

In another embodiment, the filter has ≥60 pores per inch.

In another embodiment, the filter could be a bed filter, a porous tube or any known filtration media for molten metal.

In another embodiment, the molten metal includes aluminum.

In another embodiment, the driven element is at least partially covered by a refractory material.

In another embodiment, further including at least one additional vibrator, the vibrator and additional vibrator operable independently or simultaneously and at the same frequency or different frequencies.

In another embodiment, a method of priming a filter with pores for filtering molten metal, the filter disposed in a reservoir, includes the steps of pouring the molten metal into the reservoir onto the filter; and vibrating at least one of the molten metal, the filter or the reservoir to induce passage of the molten metal into pores of the filter, displacing air residing in the filter.

In another embodiment, a method of draining a filter with pores containing molten metal, includes the steps of: vibrating the filter containing the molten metal, inducing the metal in the pores of the filter to flow out.

In another embodiment, further including the step of draining the filter of molten metal and during at least part of the step of draining, simultaneously vibrating at least one of the molten metal, the filter or the reservoir inducing the metal in the pores of the filter to flow out.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

In the processing of metals, it may be preferable to remove certain contaminants and inclusions. For example, in the case of aluminum and aluminum alloys, it may be desirable to remove oxides of aluminum and magnesium, borides, carbides, nitrides and spinels to promote a more pure metal product for various reasons. This contaminant removal has been performed by porous ceramic filters, e.g., ceramic foam filters (CFFs) through which a stream of molten metal is passed. As with filters generally, the smaller the pore size and the greater the thickness of the filter, the more effective the filtration process is in removing contaminants, but the more restrictive the filter is to flow. As applied to filtering liquid metal, ceramic filters exhibit a requirement to be primed, i.e., to initiate flow through the filter by displacing air present in the pores of the filter by liquid metal. Approaches for facilitating metal flow through ceramic filters include pre-heating the filter so the initial flow of metal is not solidified upon contacting the filter and creating a sufficient height (head) of molten metal above the filter to push the metal through the filter. Typically, there are limitations on the head of metal that may be established in a given metal handling facility, so alternative methods and apparatus have been used. For example, a low pressure may be established on the downstream side of the filter by vacuum apparatus, as disclosed, e.g., in U.S. Pat. No. 7,666,248, which is incorporated by reference herein in its entirety. In another approach, an induction coil may be used to produce Lorentz forces that act on the metal and facilitate a flow of metal through the filter as disclosed in Canadian Patent Document No. CA 2,871,245, which is incorporated by reference herein in its entirety.

The present disclosure recognizes that vibratory mechanisms may also be used to facilitate passage of molten metal through a filter. More particularly, mechanical, electrical, electro-mechanical, air powered and/or hydraulic powered mechanisms may be utilized to establish a vibration of the filter, the container/receptacle through which the molten metal passes in proximity to the filter and/or the molten metal, to facilitate metal flow through the filter. The vibration may be in the nature of a wave, e.g., a compression/pressure wave, like an acoustic wave, in one embodiment, at an ultrasonic frequency, that is transmitted through the metal from a transducer/vibrator acting on the filter, the receptacle/conduit in communication with or proximate to the filter, or the molten metal. The use of a vibratory mechanism for this purpose may permit the passage of molten metal through filters that are finer than that which would normally be used. For example, in many traditional metal purification systems, filters finer than 50 pores per inch (PPI) are not useable. In accordance with the present disclosure, filters finer than 50 PPI or finer may be used, e.g., a filter of 50 PPI to 80 PPI.

A vibratory mechanism/technique of filtration in accordance with the present disclosure may be used to facilitate priming at the beginning of the cast to use the full surface of the filter, during filtration and/or after filtration of a batch of molten metal is concluded, e.g., to promote the removal of metal and/or trapped contaminants from the filter. In this later application, the removal of metal and contaminants from the filter may extend the useful life of the filter, e.g., for a bed filter, this technique may be used to extend the life and flush inclusions to continue with a refreshed bed. It may also reduce the amount of heating that would otherwise be needed for reestablishing a flow of molten metal through the filter in a subsequent filtration run. It should be appreciated that the vibratory mechanisms and methods of the present disclosure may be used independently of the known methods and apparatus used to prime filters and promote metal flow there through. Alternatively, the vibratory approach of the present disclosure may be used in conjunction with known methods. For example a vibratory apparatus may be used independently of or in conjunction with vacuum or magnetic induction assist type of filtration promoter.

Figure 1:
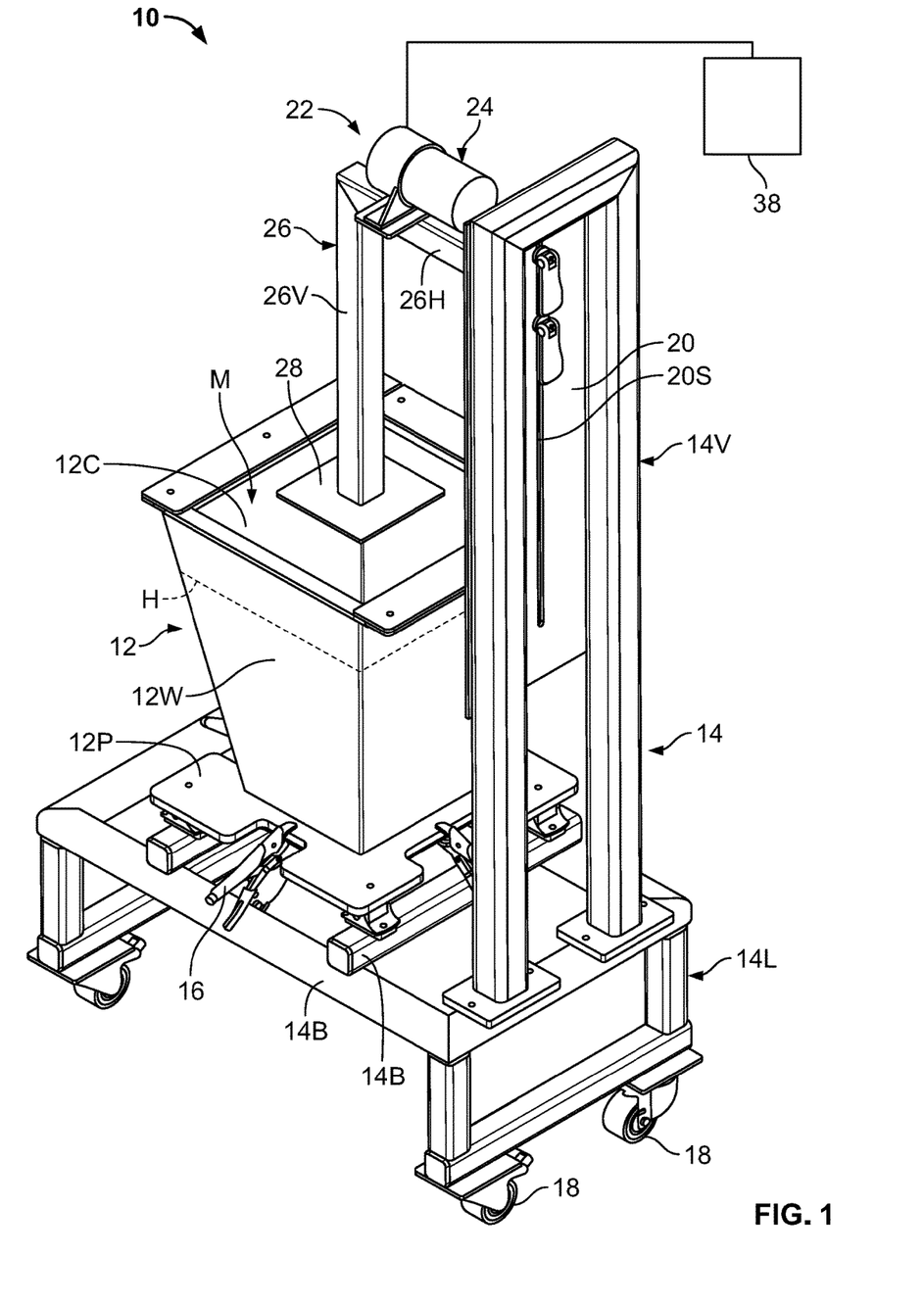
FIG. 1 is a perspective view of filtering device in accordance with an embodiment of the present disclosure.
Figure 2:
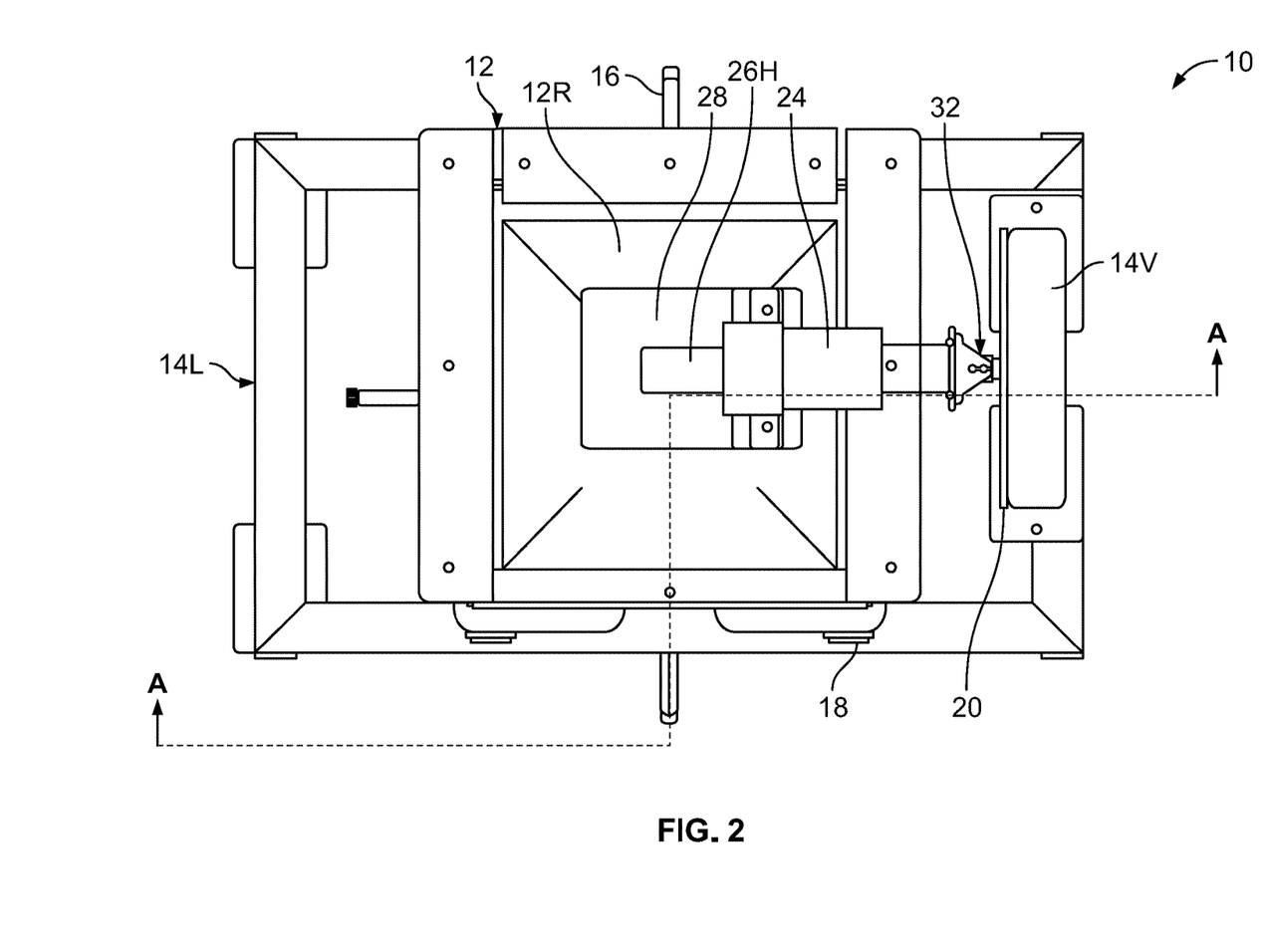
FIG. 2 is a plan view of the device of FIG. 1.
Figure 3:
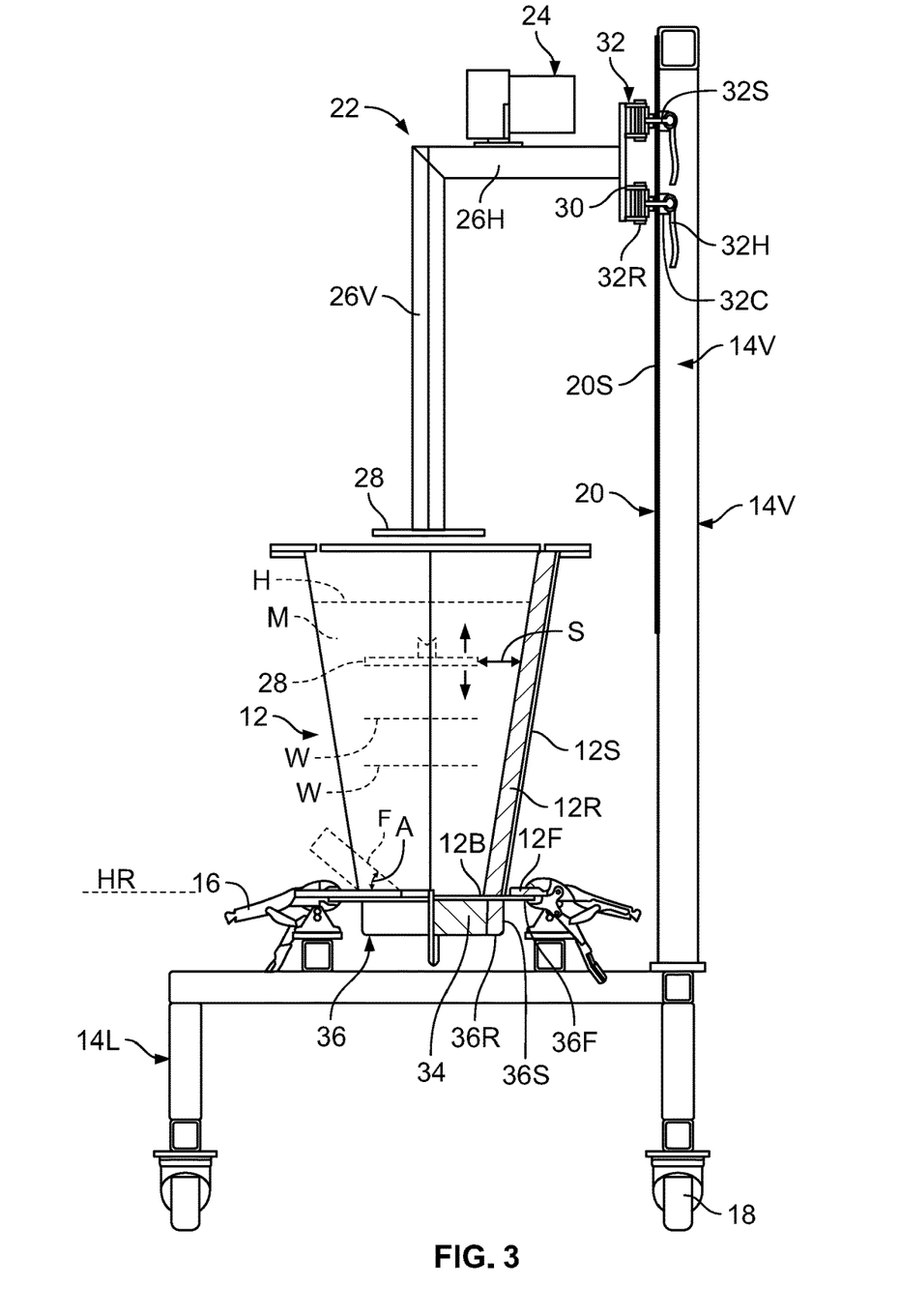
FIG. 3 is a partial cross-section of the device of FIGS. 1 and 2, taken along section line 2-2 and looking in the direction of the arrows.

FIGS. 1-3 show a filtering device 10 in accordance with an embodiment of the present disclosure, which has a receptacle 12 for molten metal M that is directed into the interior cavity 12C thereof. In the embodiment shown, the receptacle has four tapering walls 12W forming a funnel shape. The receptacle 12 is held to a supporting framework 14 by a mounting plate 12P attached to the receptacle 12 and clamped by clamps 16, e.g., in the form of Vise Grip wrenches fastened to support beams 14B of the framework 14. Alternatively, the receptacle could be fastened to the framework 14 by bolts or other types of fasteners. The framework 14 has wheels 18 permitting movement of the device 10 by rolling. The framework 14 has a lower portion 14L which supports the receptacle 12 and a vertical support 14V with a plate 20 having a slot 20S. A vibrator assembly 22 features a vibrator 24 attached to an arm 26 with a driven plate 28 attached at one end. There are a large number of different types of vibrators that could be employed, such as those driven by air, hydraulics or electrical power. These types of industrial vibrators may be obtained commercially, e.g., from VIBCO of Wyoming, R.I., U.S.A. In one example, a VIBCO model no. SCR-100 provides about 1825 impacts per minutes producing 2105 pounds of force per impact for an operating air pressure of 60 to 80 psi. In another example, the vibrator may be a jackhammer drill, such as a commercial jackhammer drill from Dewalt, producing vibrations at a frequency of 1500 impacts per minute at a magnitude of 2000 pounds per impact. In yet another example, an air driven vibrator, such as, a Martin P-Series P4S pneumatic piston vibrator from Martin Engineering of Neponset, Ill., www.martin-eng.com may be used. In this example, air pressure is converted to vibration frequency and force magnitude.

In the embodiment shown, the arm 26 has a horizontally extending portion 26H providing a selected relative horizontal position of the vibrator assembly 22 relative to the receptacle 12, e.g., allowing the driven plate 28 to be centered in the receptacle 12 and a vertically extending portion 26V permitting the driven plate 28 to be extended down into the receptacle 12 to a selected height. As shown in FIG. 3, the horizontally extending portion 26H is attached at one end to a mounting plate 30 to which one or more resilient mounting assemblies 32 (e.g., elastomeric or spring mountings) attach. The resilient mounting assemblies 32 have a resilient element 32R and a shaft 32S that attaches at one end to mounting plate 30, extend through resilient element 32R, through slot 20S and pivotally attach to a handle portion 32H with cam elements 32C. This type of handle 32H may be obtained commercially, e.g., from McMaster Carr of Elmhurst, Ill., U.S.A. When in the gripping position (with the handle portion 32H pressed down) the mounting assemblies 32 grip the plate 20 at a given, adjustable position, such that the vibrator assembly 22 may be positioned at a selected height relative to the receptacle 12 and relative to the height (head) H of molten metal M therein. The resilient elements 32R provide freedom of motion and isolate vibrational movement induced by the vibrator 24 from the supporting framework 14. The vibration induced by the vibrator 24 is transmitted along the arm 26 to the driven plate 28 and to the molten metal M, which is poured into the receptacle 12, e.g., to a height (head level) H, as shown diagrammatically in dotted lines. As can be appreciated, when molten metal is flowing through the device 10, the head level H may vary dynamically as determined by variations in inflow and outflow. The driven plate 28 may be positioned at any given depth within the molten metal, ranging from surface contact at the top surface of the molten metal M metal to a depth therein approaching the bottom of the receptacle 12.

As shown in FIG. 3, the receptacle 12 has a metal shell 12S, e.g., made from steel, and a refractory liner 12R, e.g., made from ceramic, e.g., N-14-N-17, as referred to at the website pyrotek-inc.com, alumina or any refractory material used for trough construction for molten aluminum or other metals. The refractory liner 12R may be a coating applied to the shell 12S or may be made as a separate insert that is inserted into the shell 12S after independent formation. A filter 34, e.g., made from ceramic foam (CCF) is positioned at the bottom of the receptacle 12 through which molten metal M poured into the receptacle 12 may pass to remove inclusions and contaminants. The filter may be of a type obtained commercially, such as a CCF filter from 30 PPI to 80 PPI from Selee (selee.com). In one example, the molten metal may be aluminum or an aluminum alloy. The filter 34 is contained within a filter housing 36 having an outer metal shell 36S, e.g., of steel, and an internal refractory lining 36R. The refractory lining 36R may be tapered inwardly in the discharge direction to receive a filter 34 with a complementary taper, allowing the filter 34 to be placed and held within the filter housing 36 without the filter 34 passing through. The filter housing 36 may be provided with a flange 36F that permits clamping to flange 12F on the receptacle 12 by a clamping mechanism(s), such as clamp devices 16. In this manner, the device 10, may be assembled and disassembled for inspection and maintenance.

In operation, the vibrator assembly 22 may be positioned at a selected height before or after molten metal M is directed into the receptacle 12 and secured in that position by clamp assembly 32. As shown in FIG. 3, in one approach, the vibrator assembly 22 may be positioned such that the driven plate 28 is below the surface of the metal M as shown by dotted line labeled H and diagrammatic view of the driven plate 28 shown in dotted lines. As noted above, the driven plate 28 may be positioned at the top surface (at line H) of the molten metal M. Upon actuation, the vibrator 24 induces vibration in the driven plate 28 with components of motion in the up and down direction, as shown by the up and down arrows. The vibration of the driven plate 28 generates compression/tension waves W in the molten metal M. The waves W progress in a downward direction through the metal M toward the filter 34, inducing the movement of molten metal M through the filter 34. In addition to the waves W, waves are also generated with components in a side-to-side direction, as indicated by the double-ended arrow S in FIG. 3, such that the waves impinge upon the receptacle 12, setting it into motion. In addition to moving the molten metal M, the waves W transmitted through the metal M impinge upon the housing 12 and the filter 34 inducing responsive motion thereof in a variety of directions. The relative magnitude of wave propagation in any given direction will depend upon the vibrator 24, the materials and fabrication techniques used in making the arm 24 and many other factors. For example, a vibrator 24 that uses a spinning mass with eccentric mass distribution will generate a rounded wave pattern, while a vibrator 24 with a linearly oscillating mass would produce waves with more linear components.

The above described device 10 may be used to induce priming of a filter 34 at the beginning of a run or to induce clearance of metal and/or debris from a filter 34 at the end of a run. The vibrator 24 may be operated continuously during a run to increase the flow rate of molten metal M. In one embodiment, the frequency of vibration and/or the magnitude of the vibrations is adjustable by a controller 38 (FIG. 1), such as a digital electronic controller or an analog device, such as a rheostat for an electronic vibrator or a valve for an air or hydraulic vibrator, to accommodate the requirements of a specific operation, e.g., priming, cleaning of a filter, or to accommodate other variable parameters encountered in a filtering operation. For example, the frequency and amplitude of vibration may be increased as the filter 34 becomes more clogged by debris during the course of filtration. Optimal vibration parameters may be noted and used for various metals and alloys, as well as for varying degrees of contamination and for different types of contaminants in the metal M. The driven plate 28 may have dimensions permitting an adequate flow of molten metal M between the outer periphery thereof and the refractory liner 12R of the receptacle 12 when positioned at a selected degree of insertion into the receptacle 12. In one alternative, the driven plate 28 and/or portions of the vertical portion 26V of the arm 26 may be coated with refractory material to make them more resistant to heat and to prevent unwanted heat transfer from the metal M to the vibrator assembly 22. An alternative mounting location is shown in dotted lines for vibrator 24', viz., on side wall 12S proximate filter 34. As shown, the vibrator 24' is oriented at an angle A relative to a horizontal reference line H. A force vector F emanating from the vibrator 24' is at an angle A, e.g., 45° relative to reference line H. Force vector F bisects the right angle between reference line H and the vertically oriented direction of metal flow and therefore is also disposed at 45° relative to the direction of metal flow. Other mounting positions and orientations may be utilized.

Figure 4:
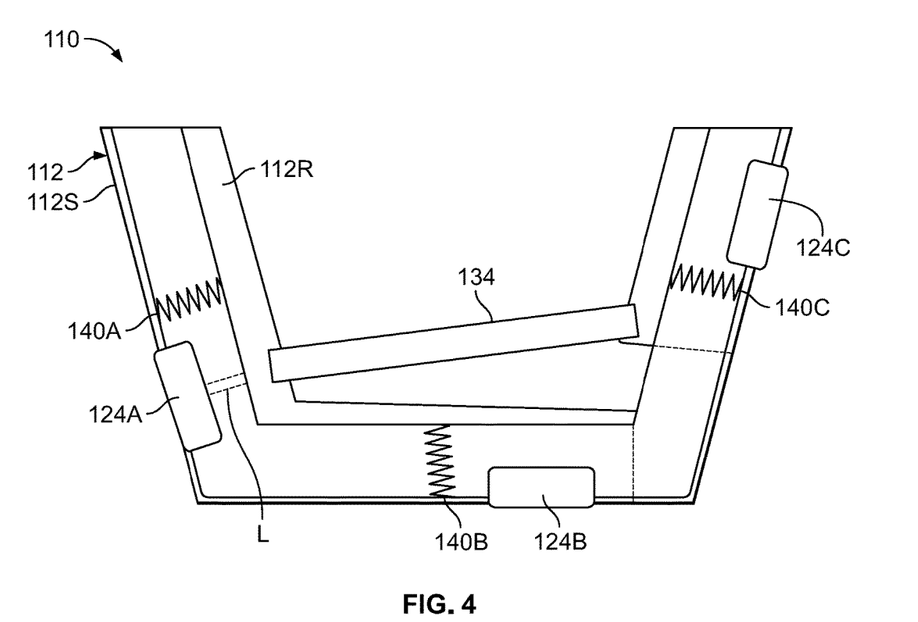
FIG. 4 is a diagrammatic view of a filtering device in accordance with an alternative embodiment of the present disclosure.

FIG. 4 shows a filtering device 110 in accordance with another embodiment of the present disclosure and having a receptacle 112 with an outer shell 112S, e.g., of steel and a refractory liner 112R. A filter 134, such as a ceramic filter (CCF) is positioned within the refractory liner 112R to filter molten metal (not shown) that passes there through. One or more resilient elements 140A, 140B, 140C, such as springs, are interposed between the refractory liner 112R and the shell 112S, permitting the refractory liner 112R to move independently of the shell 112S. One or more vibrators 124A, 124B, 124C of a type as described above are assembled to the shell 112S, such that upon operation, the vibrators 124A, 124B, 124C induce vibrations in/of the shell 112S of a selected frequency and amplitude. In one alternative embodiment, the vibrations are conducted through the resilient elements 140A, 140B, 140C to the refractory liner 112R. The resilient elements 140A-140C are diagrammatically depicted as a springs, but could be elastomeric members. In another embodiment, the vibrators are mechanically coupled to the refractory liner 112R, such that they directly impart vibrations to the refractory liner 112R, which is suspended in the shell 112S by the resilient elements 140A, 140B, 140C. Link L extending between vibrator 124A and refractory liner diagrammatically illustrates a mechanical connection. The resilient elements 140A, 140B, 140C allow the refractory liner 112R to move (vibrate) independently of the shell 112S and independently of structures that the shell 112S is supported by or coupled to. The vibrators 124A, 124B, 124C may be of the same type and set to deliver vibrations of the same frequency and magnitude or they may be of different types and may be set to deliver vibrations in different frequencies and magnitudes. The vibrators 124A, 124B, 124C may be supplied by a common energy source, such as a common pressurized air line or electrical supply line or be energized by separate sources, which may be of the same type or of different types, e.g., electrical and pressurized air. The vibrators 124A, 124B, 124C may be operated simultaneously, in subsets or individually, in sequence, as fitting for the stage of operation of the filter device 110, e.g., priming, filtering or draining.

Figure 5:
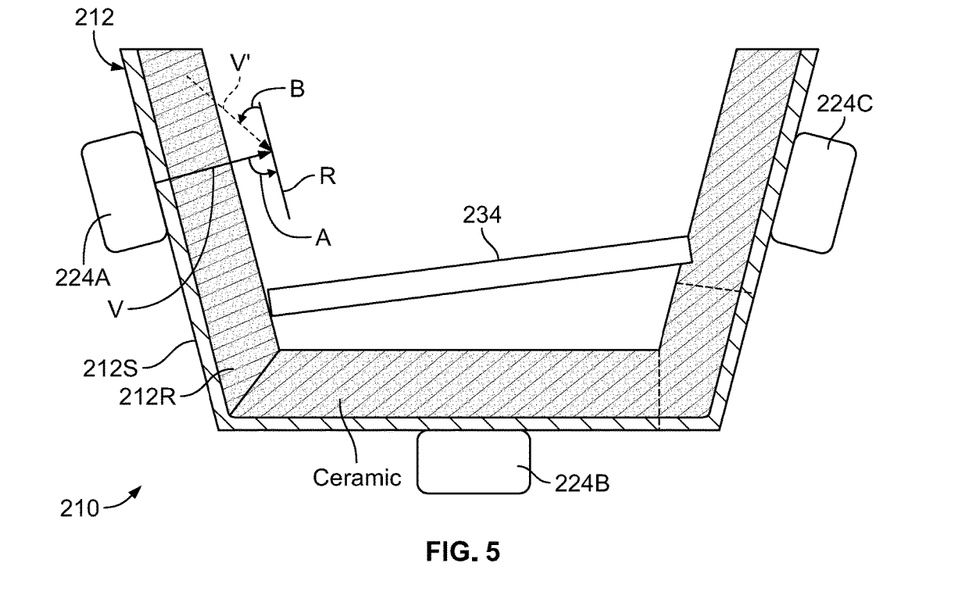
FIG. 5 is a diagrammatic view of a filtering device in accordance with another alternative embodiment of the present disclosure.

FIG. 5 shows a filtering device 210 in accordance with another embodiment of the present disclosure and having a receptacle 212 with an outer shell 212S, e.g., of steel and a refractory liner 212R. A filter 234, such as a ceramic filter (CCF) is positioned within the refractory liner 212R to filter molten metal (not shown) that passes there through. One or more vibrators 224A, 224B, 224C, of a type as described above, are assembled to the shell 212S such that upon operation, the vibrators 224A, 224B, 224C induce vibrations in/of the shell 212S of a selected frequency and amplitude. Since the shell 212S is in contact with refractory liner 212R, and the filter 234 is in contact with the refractory liner 212R, the vibrations are conducted to the refractory liner 212R and filter 234. In addition, when the receptacle 212 contains molten metal (not shown), the vibration of the refractory liner 212R and the filter 234 will also be imparted to the molten metal. It should be appreciated that vibrators 24, 124A-C and 224A-C may be adjustable in frequency and amplitude, such that the vibrator(s) may be adjusted to have maximum efficacy in light of the specific parameters of the components that they set in motion, e.g., the mass, density, flexibility, etc. of the shells 12, 112, 212, the refractory liners 12R, 112R, 212R and the metals that are contained therein.

FIG. 5 also shows that the line of vibratory force V may be directed at any given angle A, B, etc. relative to a reference orientation R. In the instance shown, the reference orientation R is parallel to the wall of the shell 212S and perpendicular to the filter 234, with angle A being about 90°. As shown by angle B, the vibrator 224A could be repositioned/mounted to generate a vibratory force along dotted line V', which is at an angle of about 45° relative to the reference orientation R. Given that the vibrators 24, 124, 224A-224C can be installed on any given surface if the filtering device 10, 110, 210, a vibratory force V may be directed at any angle relative to a given reference orientation. As shall be described below, a force V directed at 45° relative to metal flow through the filter 34, 134, 234 provides good results in filter devices 10, 110, 210 tested. Other reference orientations and force V angles may be selected based upon the shape of the filter device and other factors.

It should further be appreciated that while embodiments using a refractory liner, e.g., 12R have been described above, receptacles made from heat resistant metals, such as steel or cast iron could also be used without a refractory liner for forming a receptacle that receives molten metal and conducts it through a ceramic filter contained therein.

Figure 6:
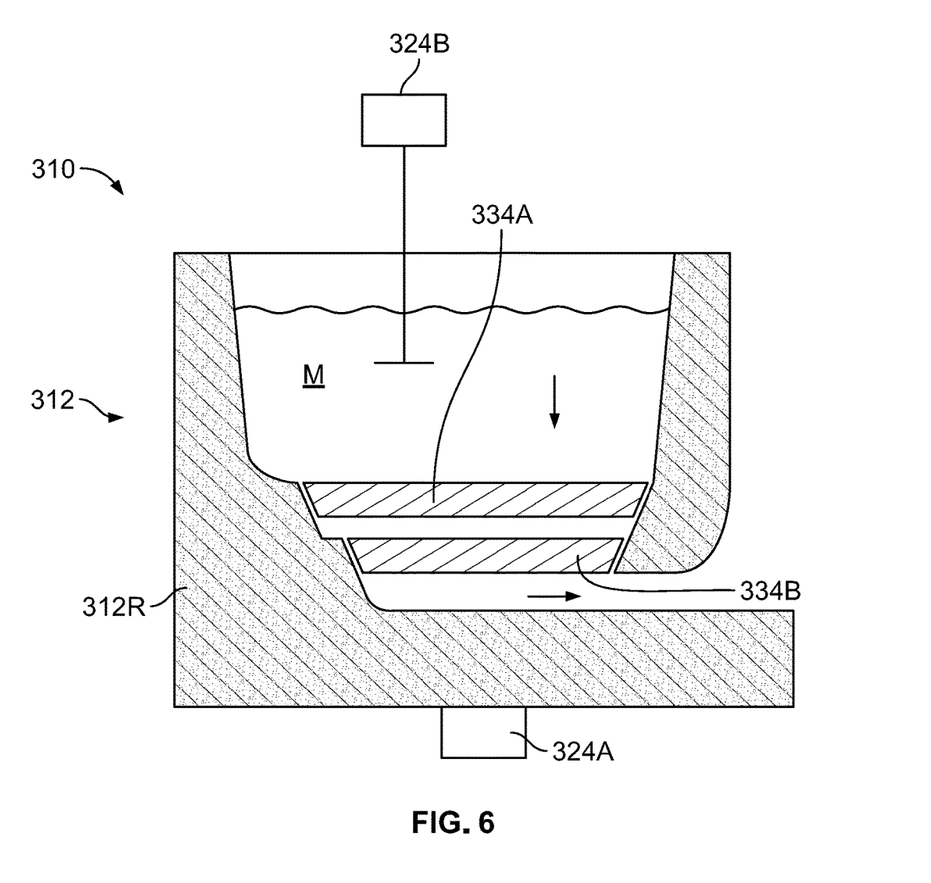
FIG. 6 is a diagrammatic view of a filtering device in accordance with another alternative embodiment of the present disclosure.

FIG. 6 shows a filtering device 310 having a receptacle 312 that may or may not utilize an outer shell and a refractory liner. In the embodiment shown, the filtering device 310 utilizes only a refractory element 312R. A pair of spaced filters 334A and 334B bridging a hollow defined by the refractory liner 312R are positioned to sequentially filter molten metal M, which flows through the device 310, as indicated by the arrows. A vibrator 324A is attached to the refractory element 312R and induces vibrations therein, in the filters 334A and 334B, and in the metal M, to facilitate flow through the filters 334A and 334B and the device 310. The filters 334A and 334B may be of the same thickness and porosity or of different thickness and or porosity. In one embodiment, the filter 334A has a courser porosity, e.g., 50 PPI than filter 334B, e.g., 60 PPI. Optionally, a vibrator 324B, like vibrator 24A of FIG. 1 may be used in substitution or in conjunction with vibrator 324A.

Figure 7:
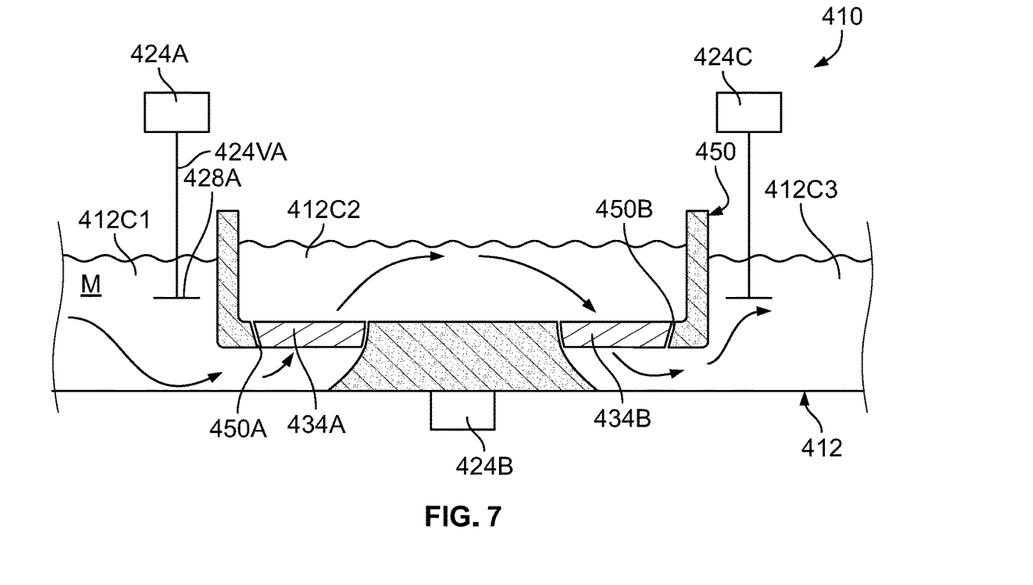
FIG. 7 is a diagrammatic view of a filtering device in accordance with another alternative embodiment of the present disclosure.

FIG. 7 shows a filtering device 410 having a receptacle 412 into which a filtration structure 450 has been installed. The receptacle 412 may be in the form of a tank or channel of refractory material, such as N-14-N-17 or any other industrial material used to contain molten metal, that conducts molten metal M by gravity as it flows from one filter to another. The filtration structure 450 interrupts the flow of molten metal M, dividing the receptacle 412 into three chambers 412C1 (upstream), 412C2 (intermediate) and 412C3 (downstream). A pair of filters 434A, and 434B are sealingly received in passageways 450A, 450B, respectively, to filter molten metal M as is flows through the chambers 412C1, 412C2 and 412C3, sequentially filtering molten metal M which flows through the device 410. In one embodiment, a vibrator 424A with arm 426VA and driven plate 428A acts upon the molten metal in chamber 412C1 to induce vibrations in the metal M, the receptacle 412, the filter 434A and the filtration structure 450 to increase metal flow through the filter 434A and the device 410. The vibrations induced by vibrator 424A may be sufficient to facilitate flow through filter 434B. In the alternative, a vibrator 424B acting on the receptacle 412 and/or a vibrator 424C may be used sequentially or simultaneously to improve flow through filters 434A, 434B and the device 410. The filters 434A, 434B may be of the same thickness and porosity or of different thickness and or porosity. In one embodiment, the filter 434A has larger pores, e.g., 50 PPI than filter 434B, e.g., 60 PPI, such that filter 434A conducts a first level of filtration of larger particles and filter 434B conducts a second level of filtration of smaller particles carried in the metal M.

Figure 8:
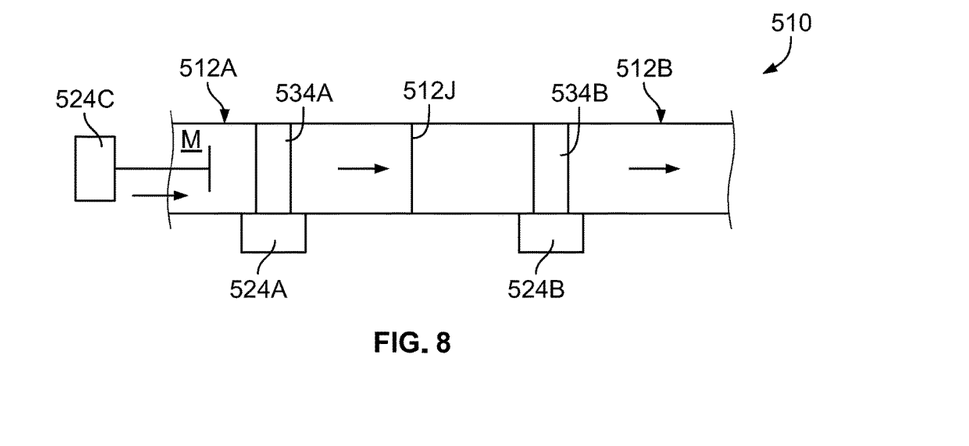
FIG. 8 is a diagrammatic view of a filtering device in accordance with another alternative embodiment of the present disclosure.

FIG. 8 shows a filtering device 510 having two receptacles 512A, 512B, each of which has a filter 534A and 534B therein, respectively and joined at a junction 512J. In another alternative, the receptacles 512A, 512B could be integrated into a continuous trough or channel through which molten metal M flows. The receptacles 512A, 512B may be in the form of tanks or channels of refractory material, such as N-14-N-17 or another type used in molten metal industries, that conducts molten metal M by gravity as it flows from filter to filter. The filters 534A, and 534B are sealingly received in receptacles 512A, 512B, respectively, to filter molten metal M as is flows there through, sequentially filtering molten metal M which flows through the device 510. Vibrators 524A, 524B act upon the receptacles 512A, 512B, the filters 534A, 534B, and the metal M contained therein to increase metal flow through the filters 534A, 534B and the device 510. In the alternative, one or more vibrators 524C, like vibrators 424A and 424B may be used to act directly on the metal M in receptacles 512A, 512B to improve flow through filters 534A, 534B and the device 510. The filters 534A, 534B may be of the same thickness and porosity or of different thickness and or porosity.

Figure 9:
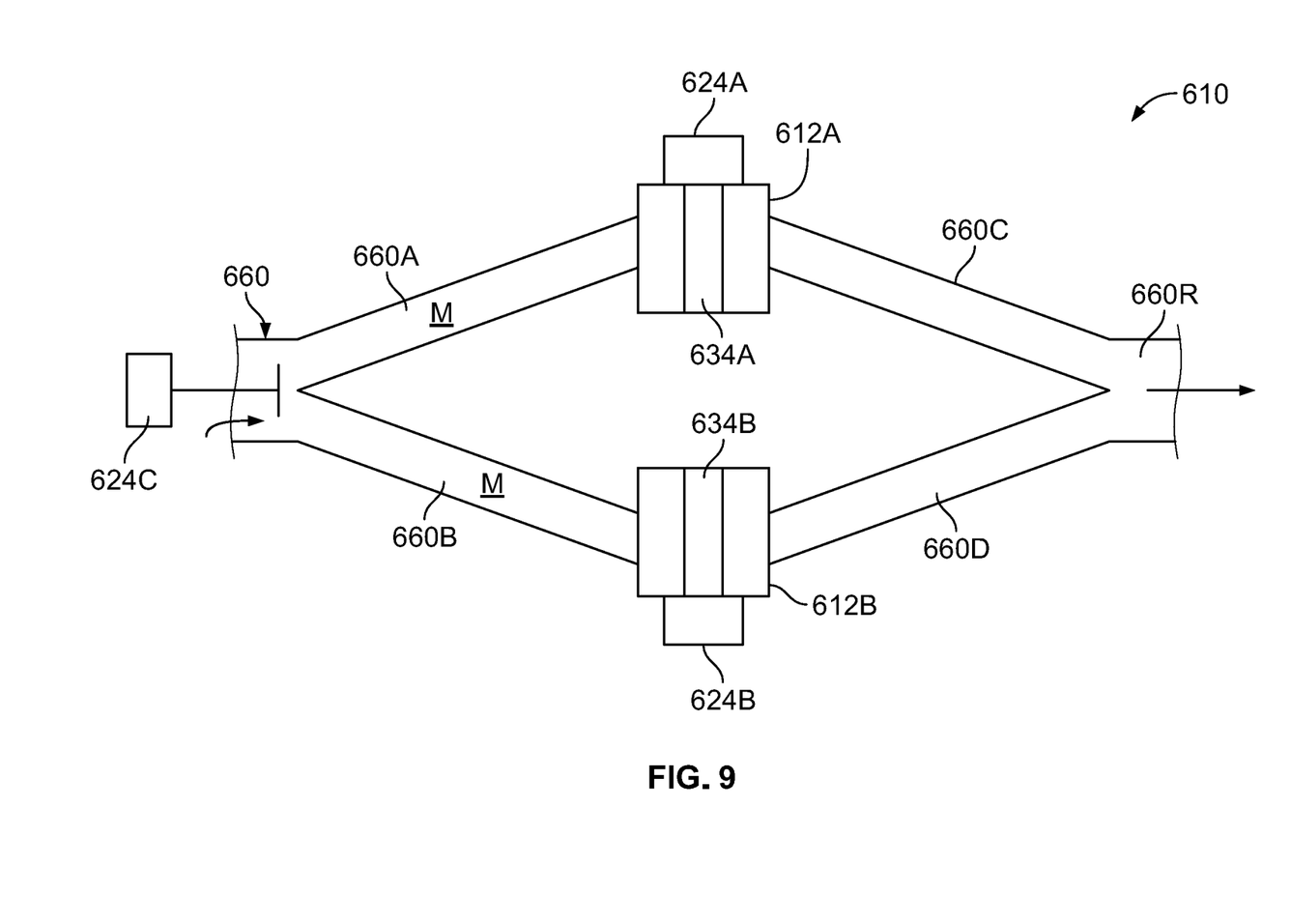
FIG. 9 is a diagrammatic view of a filtering device in accordance with another alternative embodiment of the present disclosure.

FIG. 9 shows a filtering device 610 having two receptacles 612A, 612B, each of which has a ceramic filter 634A and 634B therein, respectively. The receptacles 612A, 612B are supplied with a flow of molten metal M by a conduit 660 that splits in parallel paths 660A, 660B. After passing through the receptacles 612A, 612B and filters 634A and 634B, a pair of conduit paths 660C and 660D rejoin in rejoined conduit 660R to pass the metal M on for a next stage of processing. In one alternative, the conduits 660, 660A, etc., may be channels or troughs made from a refractory material. The filters 634A, and 634B are sealingly received in receptacles 612A, 612B, respectively, to filter molten metal M as is flows there through. Vibrators 624A, 624B act upon the receptacles 612A, 612B, the filters 634A, 634B and the metal contained therein to increase metal flow through the filters 634A, 634B and the device 610. In the alternative, one or more vibrators 624C, like vibrators 424A and 424B may be used to act directly on the metal M in conduit 660, 660A, 660B, etc. and receptacles 612A, 612B to improve flow through filters 634A, 634B and the device 610. The filters 634A, 634B may be of the same thickness and porosity or of different thickness and or porosity. The vibrators, e.g., 324B, 424A, 524C, 624C, etc., shown in FIGS. 1-9 may be oriented to generate vibration forces in a selected direction, e.g., at an orientation of 45° relative to the filter 34, 134, 234, 334A, etc. and/or the metal flow direction.

Experimental Testing
Lab Scale

The apparatus and methods described above were tested under the parameters listed below in Table 1. More particularly, a filter device 10 like that shown in FIGS. 1-3 with a vibrator 24 or 24' was utilized to filter molten aluminum using the stated parameters of Table 1.

| Test | CFF used ppi | Alloy | Metal Temp before pouring C. | CFF preheat | Time to prime | Vibrating system | Filter weight g | Filter weight empty g | Height of Priming mm |
|---|---|---|---|---|---|---|---|---|---|
| 1 | 30 | P1020 | 700-710 | yes | 30 | no | 1709 | | 208 |
| 2 | 60 | P1020 | 700-710 | yes | 30 | no | | | 282 |
| 3 | 60 | P1020 | 700-710 | yes | 15 | no | 2055 | | 282 |
| 4 | 60 | P1020 | 700-710 | yes | 20 | Vibco on steel box | | | 203 |
| 5 | 60 | 5% Mg | 700-710 | yes | 20 | Vibco on steel box | | | 203 |
| 6 | 50 | 5% Mg | 720 and more | yes | 20 | With the arm and Vibco system | | | 203 |
| 7 | 50 | 4.0% Mg | 700-710 | yes | | Vibco on steel box | | | 203 |
| 8 | 60 | 3.5% Mg | 700-710 | yes | 15 | no | 2000 | | 282 |
| 9 | 60 | 3.5% Mg | 700-710 | yes | 8 | Jack 45 | 2352 | | 203 |
| 10 | 60 | 3.5% Mg | 700-710 | yes | 35 | Jack 45 | | | 127 |
| 11 | 50 | 3.5% Mg | 720 and more | yes | 5 | Jack 45 | 2337 | | 127 |
| 12 | 60 | 3.5% Mg | 720 and more | yes | 5 | Jack 45 | 2226 | | 127 |
| 13 | 60 | 3.5% Mg | 720 and more | yes | 15 | Jack 45 | | | 76.2 |
| 14 | 40 | 3.5% Mg | 720 and more | no | 15 | Jack 45 | | | 127 |
| 15 | 50 | 3.5% Mg | 720 and more | no | 15 | Jack 45 | | | 127 |
| 16 | 60 | 3.5% Mg | 720 and more | no | n/a | Jack 45 | | | 127 |
| 17 | 50 | 3.5% Mg | 720 and more | no | 20 | Jack 45 | | | 203.2 |
| 18 | 60 | 3.5% Mg | 720 and more | yes | 12 | Jack 45 | | | 152.4 |
| 19 | 50 | 3.5% Mg | 720 and more | yes | 20 | air vibration system | | | 152 |
| 20 | 30 | 2.5% Mg | 720 | no | 60 | no | 1594 | 510 | 127 |
| 21 | 30 | 2.5% Mg | 717 | yes | 20 | jack 45 | 2126 | 500 | 76.2 |
| 22 | 50 | 2.5% Mg | 725 | yes | 60 | no | 2076 | 434 | 254 |
| 23 | 50 | 2.5% Mg | 717 | no | 30 | jack 45 | 1854 | 496 | 127 |
| 24 | 40 | 2.5% Mg | 720 | yes | 10 | jack 90 | 1310 | 530 | 127 |
| 25 | 40 | 2.5% Mg | 710 | yes | 20 | jack vertical | 1690 | 538 | 127 |
| 26 | 50 | 2.5% Mg | 723 | yes | 30 | jack vertical | 1998 | 480 | 127 |
| 27 | 50 | 2.5% Mg | 725 | yes | 15 | jack 90 | 2190 | 520 | 127 |
| 28 | 40 | 25% Mg | 735 | yes | 10 | jack 45 | 1771 | 498 | 127 |
| 29 | 30 | 2.5% Mg | 722 | yes | 10 | jack vertical | 1520 | 488 | 127 |

As can be appreciated from the above table, there is a correlation between the time to prime, whether vibration is used and the device used. More particularly, holding other parameters equal, i.e., ppi, alloy, temperature, pre-heating of filter, etc., and varying the presence of vibration and type of vibrator, one series of testing indicated that the time to prime 1) with no vibration was 22 seconds; 2) with vibrations from a jackhammer drill, 14 seconds; 3) with vibrations from a Vibco vibrator, 20 seconds; and 4) with vibrations from another air vibrator, 20 seconds. This testing indicates that vibration promotes quicker priming and that the jackhammer drill was the most effective vibrator.

As can be appreciated from Table 1, there is a correlation between the weight of the filter in grams/cm$^2$, pre-heating of the filter and whether vibration is used. The filter is weighed after use and the weight includes the weight of the filter itself plus any residual metal that remains in the filter. The greater the weight, the better, the weight being an indication of the filter area/volume used. In a poor use of filter area, a small cross-sectional area or channel through the filter conducts the metal through the filter. More effective filtration conditions utilize more of the filter to pass metal, leading to greater throughput and better filtering due to the distribution of metal flow over the entire filter. Holding other parameters equal: ppi, alloy, temperature, pre-heating of filter, etc., and varying the filter preheating and vibration level between vibration and no vibration led to the following results: 1) filter cold, no vibration: 1594 g/cm$^2$; 2) filter cold, with vibration: 1854 g/cm$^2$; 3) filter pre-heated, no vibration: 1960 g/cm$^2$. 4) filter pre-heated, vibration applied: 2162 g/cm$^2$; This testing indicates that vibration promotes better distribution of metal flow through the filter, either with or without pre-heat relative to no vibration being applied.

As can be appreciated from Table 1, there is a correlation between the temperature of the metal, the presence of vibration and the time to prime, i.e., the greater the temperature, and the presence of vibration, the shorter the time to prime. Holding other parameters equal: ppi, alloy, etc., and varying the metal temperature and vibration level between vibration and no vibration led to the following results: 1) metal temp 720 C, no vibration, time to prime: 21 seconds; 2) metal temp 720 and above, no vibration, time to prime: 12 seconds; 3) metal temp 710 C, filter preheat, with vibration, time to prime: 12 seconds; 4) metal temp 710 C, filter cold, with vibration, time to prime: 17 seconds. This testing indicates that vibration promotes better distribution of metal flow through the filter, either with or without pre-heat relative to no vibration being applied.

Testing has revealed that there is a correlation between the weight of the filter when tested in g/cm$^2$ and the location and orientation of the vibration source. More particularly, holding other parameters equal, i.e., ppi, alloy, temperature, pre-heating of filter, etc., and varying the orientation of the vibrator 24' (FIG. 3) to change the angle A of the vibration force F between 45°, 90° and vertical (in line with or at 0/180°) positions relative to metal flow, one series of tests indicated that the weight: 1) with vibrations from a jackhammer drill at 45° was: 2111 g/cm$^2$; 2) with vibrations from a jackhammer drill at 90°: 1750 g/cm$^2$; 3) with vibrations from a vertical jackhammer drill: 1738 g/cm$^2$; and 4) the weight without vibrations was 1886 g/cm$^2$. This testing indicates that vibration with the jackhammer drill was the most effective at an angle of 45°, with 90° and vertical orientations being counterproductive.

Testing has revealed that there is a correlation between the time to prime and the location and orientation of the vibration source. More particularly, holding other parameters equal, i.e., ppi, alloy, temperature, pre-heating of filter, etc., and varying the orientation of the vibrator 24' (FIG. 3) to change the angle of the vibration force between 45°, 90° and vertical positions relative to the metal flow, and the presence of vibration, which is varied between vibrate and no vibrate, indicated that the time to prime: 1) with no vibrations was 30 seconds; 2) with vibrations from a jackhammer drill at 45°: 14 seconds; 3) with vibrations from a jackhammer drill at 90°: 13 seconds; and 4) with vibrations from a vertical jackhammer drill: 20 seconds. This testing indicates that vibration promotes quicker priming and that the jackhammer drill was the most effective at an angle between 45° and 90°.

The foregoing testing was repeated changing the ppi values of the filters between 30 ppi and 40 ppi and weighing the filters. The testing revealed: 1) a 30 ppi filter with no vibration resulted in a weight of 1,147 g/cm$^2$; 2) a 30 ppi filter with vibrations from a jackhammer vibrator at 45° relative to the direction of metal flow resulted in a weight of 1,626 g/cm$^2$; 3) a 30 ppi filter with vibrations from a vertical jackhammer vibrator resulted in a weight of 1,032 g/cm$^2$; 4) a 40 ppi filter with vibrations from a jackhammer vibrator at 45° resulted in a weight of 1,273 g/cm$^2$; 5) a 40 ppi filter with vibrations from a jackhammer vibrator at 90° resulted in a weight of 780 g/cm$^2$; and 6) a 40 ppi filter with vibrations from a vertical jackhammer vibrator resulted in a weight of 1152 g/cm$^2$. The foregoing tests indicate that the 45° orientation worked the best for both 30 and 40 ppi filters.

The foregoing testing was extended 50 to ppi filters resulting in the following results: 1) a 50 ppi filter with no vibration resulted in a weight of 1,642 g/cm$^2$; 2) a 50 ppi filter with vibrations from a jackhammer vibrator at 45° relative to the direction of metal flow resulted in a weight of 1,837 g/cm$^2$; 3) a 50 ppi filter with vibrations from a jackhammer vibrator at 90° resulted in a weight of 1670 g/cm$^2$; 4) a 40 ppi filter with vibrations from a vertical jackhammer vibrator resulted in a weight of 1,518 g/cm$^2$. The foregoing tests indicate that the 45° orientation worked the best for the 50 ppi filter.

The testing revealed that vibration had a positive impact on metal impregnation of the filter resulting in a 5% to 13% increase, depending on the filter. 30 ppi and 60 ppi filters had more than a 10% increase of metal impregnation with vibration. This beneficial effect is enhanced when the filter is preheated, showing an improvement in filter impregnation by metal of 13% for 50-60 ppi filters and a 24% increase for a 30 ppi filter.

A consideration of vibration vs. no vibration for a variety of filter sizes, all other factors the same, led to the following resulting filter weights: 1) 30 ppi, no vibration: 1651 g; 2) 30 ppi, with vibration: 1823 g; 3) 50 ppi, no vibration: 2076 g; 4) 50 ppi, with vibration: 2175 g; 5) 60 ppi, no vibration: 2027 g; and 6) 60 ppi, with vibration: 2289 g.

A consideration of vibration force orientation for a variety of filter sizes, all other factors the same, led to the following resulting filter weights: 1) 30 ppi, no vibration: 1709 g; 2) 30 ppi, with vibration using jack hammer drill at 45° relative to the direction of metal flow: 2126 g; 3) 50 ppi, no vibration: 2076 g; 4) 50 ppi, with vibration using jack hammer drill at 45°: 2337 g; 5) 60 ppi, no vibration: 2027 g; and 6) 60 ppi, with vibration using jack hammer drill at 45°: 2289 g.

A beneficial effect on time to prime was also observed with vibration of the filter. More particularly, a preheated 30 ppi filter time-to-prime without vibration was 30 seconds, with vibration, 15 seconds. A preheated 40 ppi filter took 13 seconds to prime with vibration. A preheated 50 ppi filter time to prime without vibration was 60 seconds, with vibration, 18 seconds. A preheated 60 ppi filter time to prime without vibration was 20 seconds, with vibration, 16 seconds. In each case, filter impregnation and time to prime were improved by vibration. For a given filter, (preheated, 30 ppi) the time to prime was 30 seconds, the same filter showed times to prime of 14 seconds when vibrated by a jackhammer drill at 45° relative to metal flow°, 13 seconds at 90° relative to metal flow and 20 seconds when at a vertical orientation, i.e. in the same direction as metal flow.

The cast alloys were also tested to determine the metal cleanliness with LiMCA (Liquid Metal Cleanliness Analyzer) and PoDFA (Porous Disk Filter Analysis from ABB Group new.abb.com and it was determined that the vibration assist in filtering did not disturb metal cleanliness, even though other parameters, such as time to prime, resultant filter weight, the ability to use finer filters and the removal of more inclusions were improved.

Full Scale Testing

Full scale testing was conducted at a casting facility that produced ingots of C17N, a pure alloy (1050 type) that is used, e.g., in litho applications, C42Z (5042) which contains 3.5% Mg and C52Z (5352), which contains 2.5% Mg. C52Z and C42Z may be used for can body applications. The cast alloys were tested to determine the metal cleanliness with LiMCA and PoDFA.

A minimum of two castings were produced per alloy to produce ingots 330 inches (minimum) in length. A maximum of three ingots could be casted at a time, which is consistent with the maximum flow rate specified (333-417 Kg/min) by the filter supplier for a 60 or 70 ppi filter that is 23×23 inches. Only 60 ppi and 70 ppi filters were used. LiMCA measurements were done on four castings. PoDFA were taken before and after a double CFF filter at 2000 mm and 4000 mm of the cast. LiMCa was taken continuously during the cast after the CFF with a special tube to minimize the effect of chlorides and bubbles at the furnace exit. Vibration of the filter was started prior to the molten metal encountering the filter and was stopped prior to casting 50 mm of the ingot. A temperature differential of about 100° C. between the bottom of the filter and top of the filter aids in filtration. Heating of the filter was done with a gas burner below and on top of the filter. A laser was used at the furnace exit after the filter to determine the metal head lost during casting. A pneumatic piston vibrator, viz., a Martin P-Series P4S vibrator from Martin Engineering of Neponset, Ill., www.martin-eng.com, was utilized as the vibrator. The vibration system was operated at 60-80 psi, producing about 1825 impacts per minute at a force of 2,105 lbs. per impact. The molten alloys were subjected to TAC (treatment of aluminum in crucible) to remove Na and Ca and alkalies. Filter weights were recorded.

The amount of time the vibrator was operated was varied to compensate for filter temperature variations to avoid casting abort due to filter clogging before 50 mm of ingot was cast. The vibration force was ramped during the starting process to cover all optimal directional G forces. Forces and corresponding pressures that resulted in resonance of the filter assembly were avoided. Resonance was observed at 30-40 psi. In this testing, maximum priming was achieved at 70 psi of air pressure to the vibrator.

The results of the full scale testing showed comparable results as in the laboratory scale testing, with an increase of 18% more metal in the filter for 60 and 70 ppi filters as a result of applying vibrations in accordance with the present disclosure. For example, standard casting processes without vibration yielded an average of 57.75 g/cm$^2$. Upon application of vibration, the filters showed and average of 68.08 g/cm$^2$ weight, corresponding to an 18% increase in weight.

A comparison of total weights of preheated filters showed the following: 1) 30 ppi with no vibration: 1709 g; 2) 30 ppi with vibration, vibrator at 45°: 2126 g; 3) 50 ppi with no vibration: 2076 g; 4) 50 ppi with vibration, vibrator at 45°: 2337 g; 5) 60 ppi with no vibration: 2027 g; 6) 60 ppi with vibration, vibrator at 45°: 2289 g.

The foregoing vibratory techniques and apparatus have been explained independently, but each and all could be employed in combination. That is, more than one type of vibrator 24 may be utilized on a single filtering device 10 and may be operated simultaneously or in a sequence. In accordance with the present disclosure, a vibrator like, e.g., vibrators 24, 124A, may be retrofitted to an existing conduit or receptacle to improve filtration by a ceramic filter. It will be understood that the embodiments described herein are merely exemplary and that a person skilled in the art may make many variations and modifications without departing from the spirit and scope of the claimed subject matter. For example, while the embodiments described above have related to the filtering of aluminum and its alloys, other metals and alloys could be amenable to filtration using the teachings of the present disclosure, such as die casting or iron casting. While a CCF ceramic filter is described above as the filtering medium, other types of filters could be employed in executing the apparatus and method disclosed in the present application, such as, bed filtration or porous tube filtration. While the vibrators described above may be used to produce a continuous vibration over a given period, a vibrator may also be employed to produce a single shock, generating a shock wave through at least one of the molten metal, the receptacle or the filter. All such variations and modifications are intended to be included within the scope of the present disclosure.

We claim:

1. A method of priming a ceramic filter with pores for filtering molten metal, the filter disposed in a reservoir, comprising the steps of:
    (A) pouring the molten metal into the reservoir onto the filter; and
    (B) vibrating at least one of the molten metal, the filter or the reservoir to induce passage of the molten metal into pores of the filter,
    (C) displacing air residing in the filter,
    (D) terminating the step of vibrating after air has been displaced from the filter and then
    (E) filtering the molten metal through the filter.

2. The method of claim 1, further comprising the steps of draining the filter of molten metal and during at least part of the step of draining, simultaneously vibrating at least one of the molten metal, the filter or the reservoir inducing the metal in the pores of the filter to flow out.

3. The method of claim 1, wherein the step of vibrating reduces the time to prime and increases the filter area used.

4. The method of claim 1, wherein the step of vibrating is conducted at a frequency range of from 1500 to 1825 impacts per minute at a force magnitude of 2000 pounds to 2105 pounds per impact.

5. The method of claim 1, further comprising a step of passing the metal through a second filter element after the metal has passed through the ceramic filter.

6. The method of claim 1, wherein the step of vibrating is conducted on the metal.

7. The method of claim 6, wherein step of vibrating is conducted by a driven plate extending into the metal.

8. The method of claim 1, wherein the step of vibrating is conducted on the reservoir.

9. The method of claim 8, wherein the step of vibrating the reservoir is conducted proximate to the filter.

10. The method of claim 8, wherein the reservoir has an inner liner that holds the metal and the step of vibrating is conducted on the inner liner.

11. The method of claim 1, wherein the step of vibrating is conducted in a direction between 45 to 90 degrees relative to a direction of metal flow through the filer.

12. The method of claim 1, wherein the step of vibrating is conducted by more than one vibrator.

13. A method of priming a ceramic filter with pores for filtering molten metal, the filter disposed in a reservoir, comprising the steps of:
  (A) pouring the molten metal into the reservoir onto the filter; and
  (B) vibrating the reservoir to induce passage of the molten metal into pores of the filter, displacing air residing in the filter, wherein the reservoir has an inner liner that holds the metal and the step of vibrating is conducted on the inner liner, wherein the reservoir has a resilient member supporting the inner liner and the resilient member allows the inner liner to vibrate independently of another portion of the reservoir during the step of vibrating.

14. A method of priming a ceramic filter with pores for filtering molten metal, the filter disposed in a reservoir, comprising the steps of:
  (A) pouring the molten metal into the reservoir onto the filter; and
  (B) vibrating an exterior surface of the reservoir with a vibrator mounted on the exterior surface to induce passage of the molten metal into pores of the filter,
  (C) displacing air residing in the filter,
  (D) terminating the step of vibrating after air has been displaced from the filter and then
  (E) filtering the molten metal through the filter.

\* \* \* \* \*